Patented Jan. 3, 1950

2,493,586

UNITED STATES PATENT OFFICE 2,493,586

METHOD OF CANNING TUNA FISH

Otto W. Lang, San Carlos, Calif.

No Drawing. Application October 22, 1947,
Serial No. 781,508

4 Claims. (Cl. 99—188)

This invention relates to a method of packing tuna fish and fish of a similar character such as bonita, yellowtail, mackerel and the like and has as its primary object the provision of a method or process whereby fish of the tuna type may be packed in cans in a fashion to retain the natural moisture of the fish and in a manner whereby greater uniformity in the quality of the product is obtained together with a substantial increase of the protein and vitamin content and the resultant improvement in the flavor or palatability of the packed fish over methods now generally employed in the fish canning industry.

Another object is to provide a method of canning tuna fish and kindred fishes whereby a greater yield may be obtained from a given catch.

A further object is to provide a method of treating tuna fish and the like preliminary to canning thereof which will mitigate against spoilage of the product, as by souring or bacterial decomposition and without loss of yield by reason of such treatment.

In the packing of tuna fish and the like, as now commonly practiced in commercial canning operations, the fish are subjected to a preliminary partial cooking action known as pre-cooking after the fish have been eviscerated and washed, and their fitness for food has been determined by examination. In effecting this preliminary cooking operation the gutted fish are placed in baskets which are put in a retort or autoclave and steam cooked in a temperature ranging from 216° F. to 220° F. or thereabouts, for a period of time according to practice depending upon the size and weight of the fish. In general the average cooking time may approximate three hours for a ten to fifteen pound fish, five hours for fish weighing twenty-five to thirty pounds, and eight hours for fish weighing fifty to fifty-five pounds, the cooking period being varied proportionately for fish of weights intermediate or more than those given in the example.

The fish are removed from the precookers on completion of the cooking and are conveyed while hot onto the cannery floor where cooling and hardening of the flesh takes place by allowing the fish to stand and cool naturally by radiation in an atmosphere of normal room temperature and humidity. Approximately twelve hours is required for this cooling operation. This is followed by cleaning in preparation for canning which consists of removing the head, and scraping off the skin and dark meat along the lateral sides of the fish. The fish are then quartered into loins, placed on trays, automatically cut to size and then transported to the canning tables where placing of the meat into cans is effected either by hand or by machine. The cans so filled are conveyed to an automatic salter, then to the oiler where they receive a salad oil following which they are sealed. Some packing plants exhaust the cans by passing them through an open steam exhaust box wherein the cans are preheated from two to four minutes at 210° F. before oiling, salting and sealing; others close the cans under a mechanical vacuum, while still others merely close the cans without any exhaust. The sealed cans are conveyed to a mechanical washing machine to remove the extraneous oil after which they are placed in baskets and transported to retorts where the contents are sterilized at a temperature of at least 240° F. for a period of time dependent upon the size of the can.

The fact that a short precook time at a constant temperature would increase the yield has been recognized. However, sour and decomposed fish has resulted in many instances when the precook time was shortened. This is due to the fact that partial sterilization against rod forms of bacteria was not complete. Hence, bacterial decomposition in the deep flesh took place as the fish cooled after the precook. In fact, the increased temperature, favorable for growth of the bacteria, enhanced the rate of decomposition. The tendency has been, therefore, to arbitrarily over precook in order to not alone avoid souring during the cooling period but also to volatilize any sour odors which may have developed through incipient spoilage in the raw flesh. This has resulted in a greatly excessive shrinkage with consequent loss in yield as well as a definite loss in quality. Excessive shrinkage in the fish during the precook will take place when the temperature in the densest part of the fish reaches approximately 200° F. The moisture contained in the fish vaporizes as the boiling point of water is approached leaving the flesh dry and woody to the taste.

As far as the applicant is aware, fish canners employ no definite relationship as to any particular precook time for various sizes or species of fish other than the employment of the principle that the larger the fish the longer the precook time, and while consideration has been given to excessive shrinkage of the fish and quality deterioration resulting from excessive precooking, no definite procedure as to the precooking time and temperature has been followed.

In carrying out the method above recited, the fish are subjected to an objectionable dehydrating action during the cooling operation which results in a loss in yield and renders the product excessively and abnormally dry and consequently low in palatability and possessing a rubbery consistency and woody texture. This loss in yield and quality progressively increases as the packing day increases due to prolonged storage of the fish preliminary to canning.

A feature of the present invention is to obviate this objectionable dehydrating action and to maintain and preserve the natural moisture content of the fish during the above recited precooking process and during the interval between the precook and the canning operations.

In carrying out the present invention, tuna fish or similar fish which are ordinarily canned in the same manner as tuna fish, after being eviscerated, washed and passed by inspection, are subjected to a predetermined precooking action in a suitable retort or autoclave, being steam cooked until the densest part of the fish reaches a temperature of approximately 160° F. but preferably not more than 170° F. regardless of the temperature employed for the precook in excess thereof.

The size of a fish determines the time at a constant given temperature to which it must be subjected in order to attain the required temperature in the densest part of the fish which is that region of the fish extending directly behind the anal end of the abdominal cavity at the backbone. The rate of heat penetration is the controlling factor and has been determined by experimentation.

In initially determining the length of time that a fish of given sizes must be cooked at a given temperature in order that the densest portion of the fish be subjected to a temperature of at least 160° F. and not more than 170° F., a thermocouple is inserted in the densest portion of the fish of given size or weight and is connected in conventional fashion to a potentiometer arranged for observation and readable to denote temperatures developed within the fish during cooking thereof. A graph is made denoting the change of temperature reading of the potentiometer over a period of time in a fashion to record the length of time required to cook the fish at a given temperature to bring the temperature of its densest portion from normal up to the sterilization temperature, thus enabling fairly accurate determination of the period of time required to cook a fish of given size in order to effect thorough sterilization thereof without such excessive cooking as would result in material loss in yield and quality.

It has been ascertained, and experience has shown, that proper sterilization of tuna fish may be effected in the precooking operations at a temperature of 220° F. in much less time than that now generally employed by fish canners. For example, it has been determined that a tuna type fish weighing from ten to fifteen pounds need be cooked at a temperature of 220° F. for only two hours to bring the densest part of the fish to the sterilizing temperature of 160° F. and not more than 170° F. as compared with the now general practice of cooking tuna fish of such size at such temperature for three hours or thereabouts. Likewise, a tuna fish weighing fifty-five pounds need be cooked at the stated temperature for only four and one-half hours in order to effect sterilization of the entire fish as compared with eight hours as now generally practiced. Manifestly, the cooking time of tuna fish of sizes other than the above example will be varied proportionately. In any instance, by limiting the cooking of the fish to bring the temperature of the densest portion to not more than 170° F. but to a temperature of at least 160° F. the cooking time will be reduced one-third or more from that now generally practiced by fish canners thus greatly reducing cannery costs as well as effecting an increase in yield and bettering the quality of the product and rendering it more uniform in quality.

In order to obtain uniformity in the precooking operation the fish are cooked in batches of similar sizes, preferably within a range of five pounds, as from ten to fifteen pounds, fifteen to twenty pounds, twenty to twenty-five pounds, and so on; each batch being cooked the required length of time at the predetermined temperature to insure the subjection of the densest portion of the fish to the required temperature.

The above recited cooking temperature of 220° F. and the cooking time are given by way of example and as being suitable for accomplishing the desired result and not by way of limitation, since neither this temperature nor the cooking times are critical as manifestly the cooking temperature may be varied within limits with a proportional variation in the cooking time and yet attain the specified precook of the densest portion of the fish at a temperature of 160° F. to 170° F. or thereabouts.

From the applicant's viewpoint the precooking procedure acts as a shrinking process between the raw and the cooked fish wherein the raw flesh is so precooked that no further shrinkage will take place when the canned material is retorted, but it is desirable not to over precook to a point where the flesh becomes dehydrated. The precook also acts as a protein coagulating agent and as a means of affecting a partial sterilization against rod and cocci forms of bacteria (microorganisms). Proteins will coagulate and assume the cooked state when a temperature of the order of 140° F. or thereabouts is reached while sterilization within the fish against rod forms of bacteria takes place at temperatures ranging from about 160° F. to 170° F. or thereabouts. The point at which sterility is reached is dependent upon the heat resistance of the rod forms present, the size of fish and the rate of heat penetration.

During the recited precooking action in which the fish are arranged in baskets in the autoclave and are subjected to the action of live steam, juices are extracted from the fish and drained therefrom: the juices being collected in a suitable reservoir in association with steam condensates developed in the autoclave. These juices are rich in proteins and in the vitamins thiamin, riboflavin and niacin extracted from the fish by the cooking operation.

A feature of the invention resides in causing at least a portion of the juices to be re-incorporated with the fish, which is accomplished by spraying the hot fish with a mixture of the juices and condensates at a time or at intervals during the cooking operation and/or at the conclusion thereof; the fish thus being caused to absorb about seven percent of the juice mixture. This operation restores to the fish a quantity of the extracted proteins and vitamins, and accordingly enhances the flavor and the food value of the product.

Following the stated precooking action, the fish on being removed from the cooker are immediately subjected to a confined and controlled humidified cooling action, which is accomplished by storing the pre-cooked fish in a cooling chamber of the ice box type, the temperature of which is preferably maintained at from about 35° F. to 60° F. or thereabouts, and wherein the humidity is regulated and preferably maintained from about 95 percent to 99 percent or thereabouts. However, the stated temperature range and the preferred percentage of humidity in the cooling operation are not critical other than that it is desirable that the temperature be above freezing and below a temperature at which the fish would be subject to bacterial spoilage over a prolonged storage period, and that the humidity be above that at which material evaporation of the natural moisture content of the fish can take place. For example, the humidity of the cooling chamber may be as low as 75 percent and possibly lower. The desired humidity is attained by introducing water into the cooling chamber in the form of a spray to moisten the air content of the chamber and maintaining a circulation of the moistened air by the aid of fans or blowers.

The fish are subjected to this cooling action in a confined and controlled humidified atmosphere until the temperature of the fish has been lowered sufficiently to permit handling thereof, after which the fish are removed from the chamber as needed and then cleaned, canned and sterilized in the usual manner. While the fish may be confined in the humidified cooling chamber for a prolonged period, it is important that the batch of fish not be removed from the cooling chamber and subjected to normal atmosphere until the fish have been sufficiently cooled to permit their being cleaned, cut and placed in cans without loss of their moisture content by evaporation. In other words, on completion of a desired humidified cooling action the fish should be cleaned and canned with a minimum of exposure to normal atmosphere.

By employment of the recited step of precooking the fish at the specified temperature the destruction of decomposing bacteria will be insured without loss of yield due to evaporation of the natural juices of the fish. By cooling the fish in a moisture laden cooling atmosphere, as specified, the flesh of the fish will be maintained at the normal moist state of from 65 percent to 68 percent or thereabouts. By causing the precooked fish to absorb a portion of the extracted juices the product is enriched by replacement of proteins and vitamins which with the preservation of the natural moisture of the fish renders it highly palatable.

Cooling of the fish after precooking by subjecting it to the stated combined humidified cooling action serves to harden the flesh while maintaining its normal moisture content thus conditioning the fish so as to facilitate handling and cutting thereof preliminary to placing in containers and also insures the production of a firm uniform pack.

The combination of the recited steps results in a uniform pack of high quality with a material increase in yield in comparison with that obtained by present practices.

While the precooking operation is preferably effected in steam, as is commonly practiced in many fish canneries, it may be effected in salt water although by so doing the extracted juices will be lost. In event of precooking the fish in salt water, the limitation of the cook may be effected as described.

Other modes of effecting precooking of the fish may be used such as by di-electric or infra-red cooking operations.

In some instances the limitation of the precook as herein set forth may be omitted, and likewise the spraying of the fish with their extracted juices may be dispensed with, in which event, however, the benefits derived thereby will be lost; the important feature of the invention residing in the step of cooling the fish without freezing on completion of the precook in an atmosphere having a humidity at which material evaporation of the natural moisture content of the fish will not take place.

While it is contemplated to maintain the cooled fish in the atmosphere of high humidity during the period from the precook until they are subjected to the cleaning, cutting and canning operation, it will be understood that where the fish are adequately chilled, temporary exposure of the fish to normal atmosphere after chilling in the humidified atmosphere may be done without detriment or departure from the invention, so long as such exposure is not such as to cause material evaporation of the natural moisture content of the fish.

By employing the feature of cooling the fish in a humidified atmosphere and maintaining the fish in such atmosphere apart from surrounding atmosphere, the fish may be held for a prolonged period without freezing before being worked and canned. For example, a batch of fish precooked one day may be cooled and held in the humidified cooling chamber for at least several days before being cleaned and canned.

This application is in substitution for and is a continuation at least in part of an application bearing Serial Number 718,101, filed December 23, 1946, now abandoned.

I claim:

1. The method of packing tuna fish consisting in subjecting fish to a precooking action in steam during which the juices and condensates extracted from the fish are sprayed over and around the fish during the cook, cooking the fish until a temperature of from about 160° F. to about 170° F. is reached in the densest part, subjecting the fish to a cooling action of from approximately 35° F. to 60° F. in the presence of a moisture laden atmosphere whose relative humidity is from 75 percent to 99 percent, then processing the fish.

2. A method consisting of precooking tuna fish in steam, spraying the fish with condensates and juices extracted from the fish at intervals during the precook, continuing the precook until a temperature of about 160° F. but not exceeding 170° F. is reached in the densest part of the fish, then cooling the fish in an atmosphere above freezing and below that at which bacterial spoilage will occur and having a humidity above that at which material evaporation of the natural moisture content of the fish can occur, and holding the fish in this state pending the canning thereof.

3. In the art of canning fish of the tuna type, the method consisting in precooking in steam a batch of fish composed of a plurality of fish of approximately corresponding weights, said precooking being at a temperature and for a period of time predetermined according to the size of the fish being cooked to subject the densest portion of the fish during the precooking thereof to a temperature of from about 160° F. to about 170° F. and thereby effecting partial sterilization of the fish without evaporation of the natural moisture content thereof, spraying the fish while hot with hot juices extracted therefrom by the precooking thereof together with condensates produced in the cooking operation whereby the fish will absorb at least a portion of the proteins and vitamins contained in the juice, then cooling the fish in a confined controlled cold but non-freezing atmosphere having a humidity higher than that at which material evaporation of the moisture content of the cooked fish will take place, and then canning the fish.

4. In the art of canning fish of the tuna type, the method consisting in precooking in steam a batch of fish composed of a plurality of fish of approximately corresponding weights, said precooking being at a temperature and for a period of time predetermined according to the size of the fish being cooked to subject the densest portion of the fish during precooking thereof to a temperature of from about 160° F. to about 170° F. and thereby effect partial sterilization of the fish without evaporation of the natural moisture content thereof, then cooling the fish in a confined controlled cold but non-freezing atmosphere having a humidity higher than that at which material evaporation of the moisture of the cooked fish will take place, and then canning the fish.

OTTO W. LANG.

REFERENCES CITED

The following references are of record in the file of this patent:

UNITED STATES PATENTS

| Number | Name | Date |
|---|---|---|
| 1,143,087 | Stafford | June 15, 1915 |
| 1,201,522 | Stafford | Oct. 17, 1916 |
| 1,330,209 | Massing | Feb. 10, 1920 |
| 1,789,349 | Ballmann | Jan. 20, 1931 |
| 2,110,801 | Hopkinson | Mar. 8, 1938 |
| 2,373,988 | Wuori et al. | Apr. 17, 1945 |

OTHER REFERENCES

"The Freezing Preservation of Foods," by Tressler and Evers, 1943 ed., page 144; Avi Publishing Co., Inc., N. Y., publishers.

"Hows and Whys of Cooking," by Halliday and Noble, third revised edition, page 293; The U. of Chicago Press, Chicago, publishers.